United States Patent [19]

Morr et al.

[11] Patent Number: 4,500,997
[45] Date of Patent: Feb. 19, 1985

[54] CHEMICAL PUMP WITH INTEGRAL DIFFUSER

[75] Inventors: Gary F. Morr, Thousand Oaks, Calif.; William A. Duncan, Huntsville, Ala.

[73] Assignee: The United States of America as represented by the Secretary of the Army, Washington, D.C.

[21] Appl. No.: 364,176

[22] Filed: Apr. 1, 1982

[51] Int. Cl.³ .............................................. H01S 3/22
[52] U.S. Cl. ........................................ 372/58; 372/89; 372/90
[58] Field of Search ....................... 372/58, 89, 90, 92, 372/59; 239/553, 433

[56] References Cited

U.S. PATENT DOCUMENTS 4,247,833  1/1981  Morr et al. ............................ 372/58

Primary Examiner—William L. Sikes
Assistant Examiner—Léon Scott, Jr.
Attorney, Agent, or Firm—Robert P. Gibson; Anthony T. Lane; Harold W. Hilton

[57] ABSTRACT

A self-contained device for pumping supersonic gas flows. The pumping device consists of a chemically activated material capable of chemical reaction with the gas mixture to be pumped, thermal ballast material, a hermetically sealable vessel for containing the chemically active material, and internal surfaces to provide gas flow passages. The internal gas flow passages are geometrically prescribed to accept a supersonic gas flow, to induce a stable normal shock, to diffuse the subsonic flow obtained after the normal shock, and to distribute the low velocity, subsonic gas flow to the reactive chemical pump material.

9 Claims, 9 Drawing Figures

CHEMICAL PUMP WITH INTEGRAL DIFFUSER

DEDICATORY CLAUSE

The invention described herein may be manufactured, used, and licensed by or for the Government for governmental purposes without the payment to us of any royalties thereon.

BACKGROUND OF THE INVENTION

State of the art chemical laser devices can be operated as a closed system by employing a chemical pump to react the laser gas flow to solid or liquid compounds possessing very low vapor pressures. The closed system laser concept consists of a gas storage and supply system, the chemical laser device, and a pumping system which is composed of a supersonic to subsonic gas diffuser, and a chemical pump. Conventional supersonic to subsonic diffusers are a very large and heavy element of the total system. The diffuser is approximately one fourth to one third of the total laser segment volume, having a length of 6 to 10 times the diffuser inlet height. Chemical pumps currently in operation are designed to accept subsonic flows only. Present pump designs are large, heavy, expensive to fabricate, and are capable only of short time continuous operation without overheating. Operational capabilities for a closed system chemical laser are severely constrained by the length and volume requirements associated with conventional supersonic to subsonic diffusers and current chemical pump designs.

Therefore, it is an object of this invention to provide a minimum length and minimum volume chemical pump.

Another object of this invention is to incorporate within the chemical pump all of the functions embodied in a supersonic to subsonic diffuser.

Another object of this invention is to increase the effectiveness of thermal ballast material which may be provided within the chemical pump.

Still another object of this invention is to reduce the complexity and cost of operations required to produce a chemical pump.

Still another objective is to provide a chemical pump which can effectively be used to increase the laser power and run duration which can be packed in a restricted weight or volume situation.

SUMMARY OF THE INVENTION

In accordance with this invention, a minimum length and minimum volume pumping system for chemical lasers is provided in which the supersonic flow passage at the inlet is generally rectangular and streamlined to the location defining a maximum internal flow area. The boundaries of this expanding flow section are porous to facilitate boundary layer removal by suction, or by other proven techniques. The chemical pump material contained above and below the expanding flow region is pressure and mass flow isolated from all chemical pump material contained in the main pump section which is downstream of the maximum flow area section. The gas flow cross-section area is subsequently gradually reduced by introducing a transverse, sinusoidal surface with amplitude which increases with axial distance downstream of the maximum flow area. Chemical pump material is contained above the upper sinusoidal surface and below and lower sinusoidal surface. The chemical pump material for this pump, typically calcium powder, has mixed with it a thermal ballast material, typically alumina, graphite, or other refractories. The heterogeneous mixture of active material and thermal ballast material is formatted in pressed pellets with shapes selected to provide controlled surface to volume ratio, controlled mass means diffusion distance, and macroporosity of the aggregated shapes. The mass ratio of thermal ballast material to chemically active material, typically calcium, is a variable which is selected to provide the desired continuous run time capability for the pump. The chemical pump when installed in a system accepts a low pressure supersonic flow, induces a stable normal shock in the expanding flow section which incorporates boundary layer removal or control techniques, diffuses the subsonic flow downstream of the normal shock, and distributes the subsonic flow to the active pump material in the main section of the pump.

DESCRIPTION OF THE PREFERRED EMBODIMENT

Figure 1:
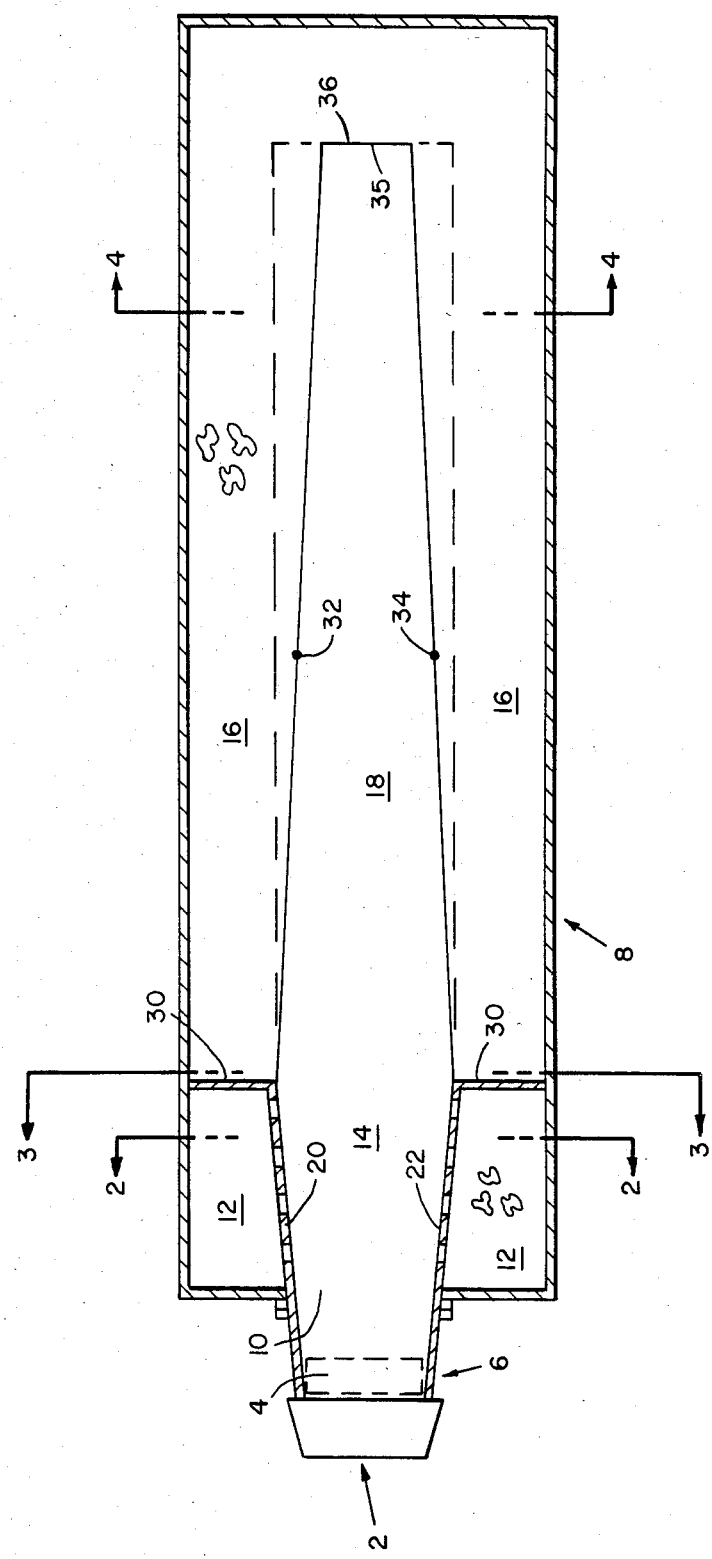
FIG. 1 is an elevational view of the chemical pump with integral diffuser in accordance with this invention.
Figure 2:
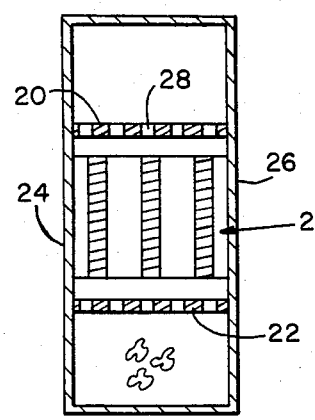
FIG. 2 is a secton view of the pump in the expanding flow section along the line 2—2 of FIG. 1.
Figure 3:
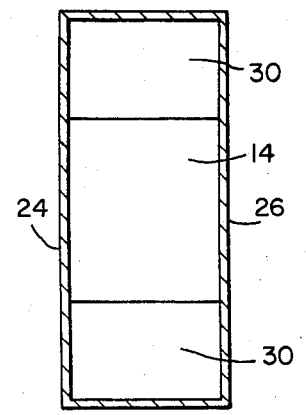
FIG. 3 is a sectional view of the pump at the maximum flow area section, along line 3—3 of FIG. 1.
Figure 4:
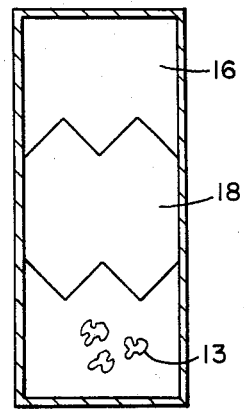
FIG. 4 is a sectional view of the pump in the converging flow area section along line 4—4 of FIG. 1.
Figure 5:
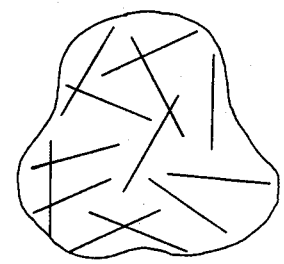
FIG. 5 is a schematic illustration of the pellets or porous shapes containing the chemical pump active material and thermal ballast.

Referring now to the drawing, a laser device 2 including an optical cavity 4 is mounted at forward end 6 of a chemical pump with integral diffuser 8. Chemical pump 8 is illustrated in FIGS. 1, 2, 3, and 4 and includes an inlet passage 10, a boundary layer removal and central section 12, an expanding gas flow section 14 for shock stabilization and subsonic gas flow diffusion, a main chemical pump section 16 for reacting the gas flow mixture to solid or liquid compounds having a very low vapor pressures and a converging gas flow section 18. Section 12 contains upper and lower surfaces 20 and 22 which are streamlined and sidewalls 24 and 26 (FIG. 2) which are parallel or tapered outwardly at a slight angle in the direction of flow. The upper and lower surfaces are shown to embody distributed circular holes 28 for removal of the boundary layer by suction, although other techniques for removal may be used. The boundary layer removal section 12 contains chemically active pump material 13 which is shown as an aggregate of individual pellets. The characteristics and contents of these pellets are summarized in FIG. 5 and will be described in a later section. A pressure bulkhead 30 (FIG. 3) is provided to insure pressure and mass flow isolation between the boundary layer removal section 12 and main chemical pump sections 16. Converging area gas flow passage 18 is provided by means of a porous metal sheet or screen 32 and 34 (FIG. 4) multiply folded longitudinally to provide a number of ridges as illustrated in FIG. 4. The height of the ridges increases in the axial flow direction, the ridge height being zero at the maximum flow area section and the ridge height being nominally one half the maximum flow area height at terminus 35, FIG. 1, such that the upper ridged surface 32 and the lower ridged surface 34 are in contact at that axial position. A planar sheet 36 is provided as an attachment plate for the ridged upper and lower surfaces. The ridged surfaces are to establish an internal gas flow passage which decreases in area in the axial flow direction, to locate the aggregated pellets of chemically active material in main pump section 16, and to provide a large surface area between the internal gas flow passage 18 and the main pump section 16. The shape and transverse frequency of the ridges are variables which may be optimally selected based on the properties of the gas mixture to be pumped and the physical and chemical characteristics of the the pellets of active pump material with thermal ballast. The pellets of chemically active material 13 contained in the boundary layer removal section 12 and the main pump section 16 are illustrated schematically in FIG. 5. The pellets can be formed from a heterogeneous mixture of chemically active powder and a suitable thermal ballast material by conventional pressing techniques.

High surface area calcium powder may be used as the chemically active pump material. Graphite, (FIG. 5) here shown as fibers, can be utilized as thermal ballast material. The primary function of the active pump material is to chemically react with all consitituents of the gas mixture to be pumped. The primary function of the thermal ballast material is to absorb thermal energy liberated by exothermic reactions between the gas mixture and the active pump material. A second function of the thermal ballast material is to provide added structural strength to the pelletized active material. A third function which may be provided by the ballast material is to provide small gas flow passages into the interior of the pellet, thus effectively reducing the distance over which the gas must travel by diffusion to reach the innermost active material. The form which the thermal ballast may be incorporated with the chemically active material is highly variable and may be optimized for specific applications. Some active pump materials may be calcium, calcium/lithium alloys. Some thermal ballast materials may be graphite, florina, magnesia, copper, Beryllium, and Beryllia.

Figure 6:
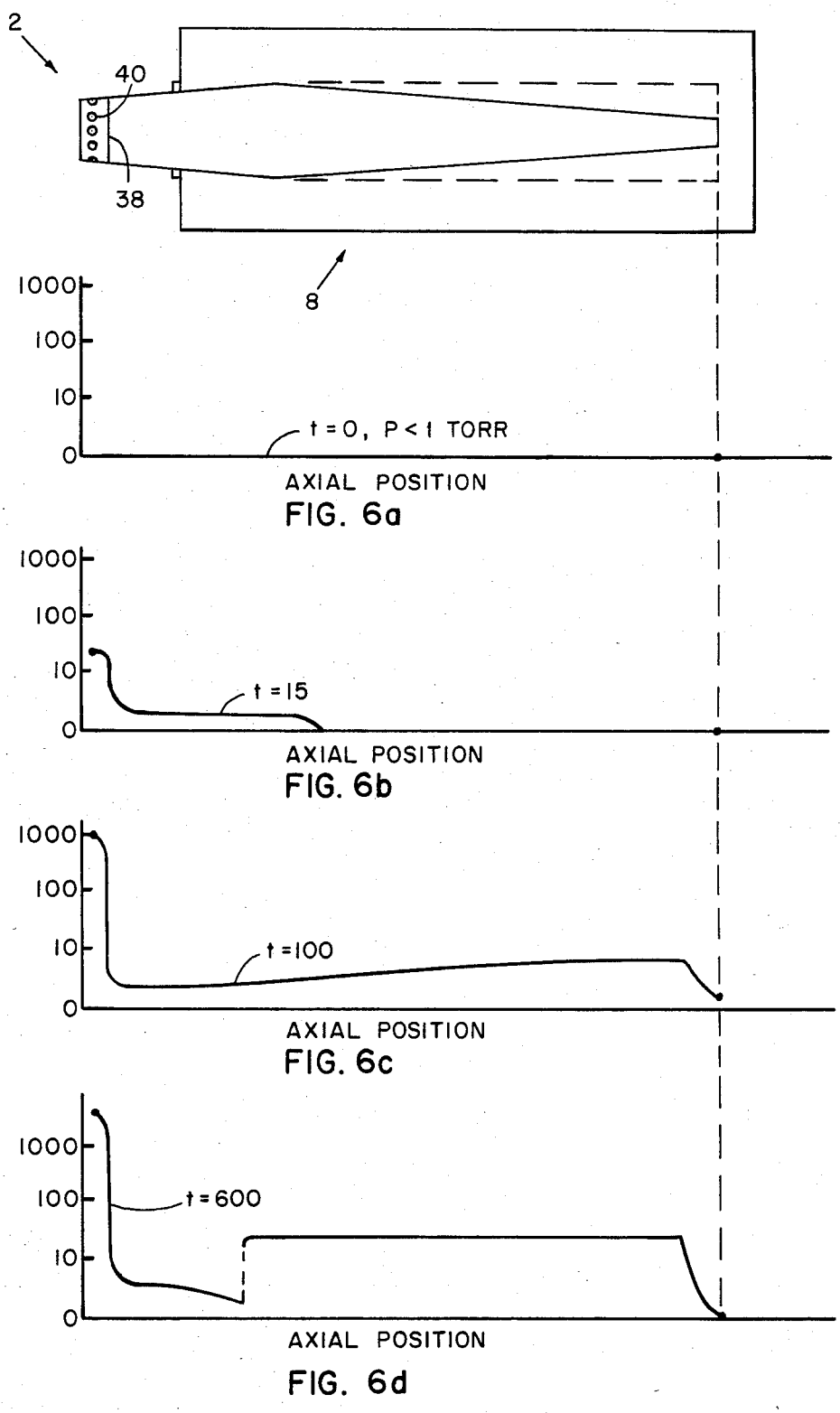
FIG. 6a–6d are schematic views of an overall chemical laser system and illustrates by graphs internal pressure distribution along actual locations of the system under specific conditions.

In operation, it is pointed out that the chemical pump with integral diffuser removes the high pressure, or ambient pressure condition, against which supersonic flow through the laser cavity must be initiated. Operation of the chemical pump with an integral diffuser is always initiated with a "zero" back pressure condition throughout the system, that is with a residual static pressure in the pump as well as the overall system of typically less than one torr. This is illustrated in FIG. 6a designating internal pressure distribution at t=0. The low pressure, or vacuum condition is provided by chemical pump sections 12 and 16 for chemical laser applications. The active pump material, typically calcium, reacts all laser gas products and purge flows under static or no flow conditions until forward and reverse reaction rates are equal, a condition which is compositional and temperature dependent, but which typically occurs at less than one-tenth torr pressure. Thus it can be seen that the chemical pump with an integral diffuser used in the operation of this system begins its function with zero pressure throughout the entire system as shown in FIG. 6a at time t=0. Laser operation actually begins with the sequenced introduction of oxidizer, diluent, and precombustor fuel into combustion chamber 38 in a conventional manner to cause rapid combustion processes to begin either by hypergolicity of the gas mixture or by conventional ignition system means. Full combustion operation in chamber 38 is achieved in about 200 to 500 milliseconds. A typical pressure profile throughout the entire laser system including the combustion chamber, laser cavity section, and the chemical pump with an integral diffuser is shown in FIG. 6 during start transient at time t=15 on graph B. For this condition, the gases have been introduced into combustion chamber 38 and fuel through nozzles 40, but actual flow has not reached the full length of the chemical pump with an integral diffuser. At t=15, (FIG. 6b) the pressure in chamber 38 has risen sufficiently to produce choked flow in the primary gas injection nozzles through nozzle passages 40. The combustion gas is progagating into the remaining evacuated regions at sonic and supersonic speeds. The gas flows predominately axially through the expanding gas flow section 14 and the converging gas flow passage 18, although some gas may pass through the boundary layer suction holes in section 12, and through the porous sheets 32 and 34 forming the converging gas flow passage. Gas which enters pump sections 12 and 16 is very rapidly reacted to form low vapor pressure chemical compounds, thereby maintaining a very low pressure in these pump sections during starting transient. Essentially no gas is present beyond the propagation front at this time. At some later time, for example at t=100 as illustrated in FIG. 6c, gas flow has reached the terminus 34 of the converging gas flow passage 18. The gas flow at this time is entirely supersonic in the expanding flow section 14, is a complex pattern of supersonic and subsonic flow in the converging flow section 18, and is subsonic in sections 12 and 16 where chemical reactions occur to maintain very low static pressure. As the combustor pressure increases with time up to its steady state or design value, the flow within the expanding flow section 14 and the converging flow section 18 undergoes a gradual change to arrive at a well defined, stable flow pattern which is characteristic of the chemical pump with an integral diffuser for the remainder of its useful operating life. Onset of this condition is illustrated for time t=600 in FIG. 6d. At this time the laser flow is steady and laser power is being extracted from the optical cavity. Flow through the expanding flow section 14 is supersonic up to the location of maximum cross-section area at which a stable normal shock is located. Flow within the converging area section 18 is subsonic throughout. A small fraction of the total laser gas flow, approximately five percent, is removed and reacted in the boundary layer removal section 12 of the pump. The remainder of the flow is progressively removed from the converging flow section through the porous plate or screen. The mass removal rate at a particular axial station is dependent upon the local gas pressure, the thermal and chemical characteristics of the active pump material and physical characteristics of the pellets in their individual and aggregate forms. The flow pattern will remain substantially as described with increasing time as the chemically active material is consumed, the static pressure in the main pump section will gradually increase, eventually reaching a maximum value for useful pump operation. This maximum pressure condition is obtained when the normal shock occurs at the pump inlet section 10, followed by subsonic gas diffusion to the maximum flow area section. The ratio of the maximum flow area section to the pump inlet section is a design parameter with considerable impact on pressure recovery performance and structural characteristics.

We claim:

1. In a closed laser system including a chemical laser having a gas storage and supply system, a self-contained device for pumping supersonic and subsonic gas flows comprising:
   a. a chemically activated material capable of chemical reaction with the gas mixture being pumped;
   b. thermal ballast material in a mixture with said chemically activated material;
   c. a hermetically sealable vessel for containing said chemically active material;
   d. said vessel being provided with internal surfaces to provide gas flow, said internal surfaces being geometrically prescribed to accept a supersonic gas flow, to induce a stable normal shock, to diffuse the subsonic flow obtained after the normal shock, and to distribute the low velocity, subsonic gas flow to the reactive chemical activated material.

2. Apparatus as in claim 1 wherein said hermetically sealable vessel includes a diverging section having an inlet for receiving supersonic gas flows and an exit for expanding said gas flow, a boundary layer section disposed above and below said diverging section, a converging section disposed in communication with said diverging section, and, a main chemical pump section disposed above and below said converging section, said boundary layer section and said main chemical pump section having said chemically active and thermal ballast materials therein.

3. Apparatus as in claim 2 including bulkhead means for isolating said boundary layer section and said main chemical pump section from each other.

4. Apparatus as in claim 3 wherein said diverging section includes upper and lower walls for separating said diverging section from said boundary layer section, said walls having holes therein for removal of boundary layer of said gas flow.

5. Apparatus as in claim 4 wherein said diverging section includes upper and lower walls for separating said diverging section from said main chemical pump section, said upper and lower walls being porous to permit gas flow therethough to said chemically activated thermal ballast materials.

6. Apparatus as in claim 5 wherein said upper and lower walls are multiply folded longitudinally to provide a plurality of ridges thereon, the height of said ridges increasing in the axial gas flow direction, said ridge height being zero at the maximum flow area section and nominally one half the maximum flow area height at the terminus thereof, said upper and lower ridged surfaces defining a gas flow passage which decreases in area in the axial flow direction.

7. Apparatus as in claim 6 wherein said chemically activated material and said thermal ballast material are in pellet form.

8. Apparatus as in claim 7 wherein said chemically activated material is calcium.

9. Apparatus as in claim 8 wherein said thermal ballast material is graphite.

* * * * *